US012503378B2

(12) United States Patent
Losh et al.

(10) Patent No.: US 12,503,378 B2
(45) Date of Patent: Dec. 23, 2025

(54) SYSTEM AND METHOD FOR REMEDIATION OF WASTEWATER INCLUDING AEROBIC AND ELECTROCOAGULATION TREATMENT

(71) Applicant: BIO2 PW INC., Centennial, CO (US)

(72) Inventors: Loren L. Losh, Strasburg, CO (US); Scott W. Powell, Aurora, CO (US); Daryl W. Haerther, Strasburg, CO (US)

(73) Assignee: BIO2 PW INC., Centennial, CO (US)

( * ) Notice: Subject to any disclaimer, the term of this patent is extended or adjusted under 35 U.S.C. 154(b) by 458 days.

(21) Appl. No.: 17/874,632

(22) Filed: Jul. 27, 2022

(65) Prior Publication Data

US 2022/0363571 A1   Nov. 17, 2022

Related U.S. Application Data

(62) Division of application No. 16/434,607, filed on Jun. 7, 2019, now Pat. No. 11,407,660, which is a division of application No. 13/774,956, filed on Feb. 22, 2013, now Pat. No. 10,358,361.

(51) Int. Cl.
| C02F 1/463 | (2023.01) |
| C02F 1/66  | (2023.01) |
| C02F 1/72  | (2023.01) |
| C02F 3/32  | (2023.01) |
| C02F 1/76  | (2023.01) |
| C02F 11/16 | (2006.01) |

(52) U.S. Cl.
CPC ............. *C02F 1/463* (2013.01); *C02F 3/322* (2013.01); *C02F 1/66* (2013.01); *C02F 1/722* (2013.01); *C02F 1/76* (2013.01); *C02F 11/16* (2013.01); *Y02W 10/37* (2015.05)

(58) Field of Classification Search
CPC .. C02F 1/463; C02F 1/66; C02F 1/722; C02F 1/76; C02F 3/322; C02F 11/16
See application file for complete search history.

(56) References Cited

U.S. PATENT DOCUMENTS

| 284,862   | A | 9/1883  | Lackersteen |
| 2,182,145 | A | 12/1939 | Eddy |
| 2,732,944 | A | 1/1956  | Hays |
| 3,340,175 | A | 9/1967  | Mehl |

(Continued)

FOREIGN PATENT DOCUMENTS

| AU | 8059182 A  | 9/1982 |
| AU | 569026 B2  | 1/1988 |

(Continued)

OTHER PUBLICATIONS

"Aeration", Water Environment Federation and American Society of Civil Engineers, 1988, pp. 1-167.

(Continued)

*Primary Examiner* — Patrick Orme
(74) *Attorney, Agent, or Firm* — Berg Hill Greenleaf Ruscitti LLP

(57) ABSTRACT

The present invention relates to a system or method for the remediation of wastewater with a treatment media in tandem with an electrocoagulation system. The system and method also include cleaning elements for cleaning distribution lines within the system and for cleaning the electrocoagulation system.

9 Claims, 5 Drawing Sheets

(56) References Cited

U.S. PATENT DOCUMENTS

| | | |
|---|---|---|
| 3,768,200 A | 10/1973 | Klock |
| 3,788,967 A | 1/1974 | Kawahata et al. |
| 3,793,173 A | 2/1974 | Kawahata et al. |
| 3,882,635 A | 5/1975 | Yamanaka et al. |
| 3,925,176 A | 12/1975 | Okert |
| 3,955,316 A | 5/1976 | Drossbach |
| 3,955,318 A | 5/1976 | Hulls |
| 3,966,567 A | 6/1976 | Pace et al. |
| 4,005,546 A | 2/1977 | Oswald |
| 4,036,726 A | 7/1977 | Gale et al. |
| 4,119,520 A | 10/1978 | Paschakarnis et al. |
| 4,125,467 A | 11/1978 | Haddad et al. |
| 4,176,038 A | 11/1979 | Moeglich |
| 4,209,388 A | 6/1980 | DeFraites |
| 4,253,271 A | 3/1981 | Raymond |
| 4,267,038 A | 5/1981 | Thompson |
| 4,293,400 A | 10/1981 | Liggett |
| 4,316,961 A | 2/1982 | Klass et al. |
| 4,321,125 A | 3/1982 | Nazarian et al. |
| 4,329,211 A | 5/1982 | Plantes et al. |
| 4,432,869 A | 2/1984 | Groeneweg et al. |
| 4,450,060 A | 5/1984 | Gonzalez |
| RE31,924 E | 6/1985 | Starr |
| 4,623,436 A | 11/1986 | Umehara |
| 4,708,809 A | 11/1987 | Davis |
| 4,770,755 A | 9/1988 | Valanti et al. |
| 4,790,923 A | 12/1988 | Stillman |
| 4,872,959 A | 10/1989 | Herbst et al. |
| 4,919,775 A | 4/1990 | Ishigaki |
| 4,966,713 A | 10/1990 | Keys et al. |
| 5,011,604 A | 4/1991 | Wilde et al. |
| 5,013,435 A | 5/1991 | Rider et al. |
| 5,043,050 A | 8/1991 | Herbst |
| 5,087,353 A | 2/1992 | Todd et al. |
| 5,227,071 A | 7/1993 | Torline et al. |
| 5,248,424 A | 9/1993 | Cote et al. |
| 5,277,814 A | 1/1994 | Winter et al. |
| 5,302,273 A | 4/1994 | Kemmerer |
| 5,423,962 A | 6/1995 | Herbst |
| 5,447,850 A | 9/1995 | McCann |
| 5,472,472 A | 12/1995 | Northrop |
| 5,525,126 A | 6/1996 | Basu et al. |
| 5,549,812 A | 8/1996 | Witt a.k.a. Witte |
| 5,571,399 A | 11/1996 | Allen |
| 5,611,907 A | 3/1997 | Herbst et al. |
| 5,622,864 A | 4/1997 | Buchanan |
| 5,627,069 A | 5/1997 | Powlen |
| 5,716,523 A | 2/1998 | Powlen |
| 5,741,426 A | 4/1998 | McCabe et al. |
| 5,744,041 A | 4/1998 | Grove |
| 5,755,852 A | 5/1998 | Northrop |
| 5,804,062 A | 9/1998 | Wyness |
| 5,866,019 A | 2/1999 | Wyness |
| 5,904,851 A | 5/1999 | Taylor et al. |
| 5,928,490 A | 7/1999 | Sweeney |
| 5,928,493 A | 7/1999 | Morkovsky et al. |
| 5,985,139 A | 11/1999 | Zoeller |
| 6,040,498 A | 3/2000 | Stomp et al. |
| 6,121,038 A | 9/2000 | Kirschner |
| 6,139,710 A | 10/2000 | Powell |
| 6,146,507 A | 11/2000 | Gustafson |
| 6,171,498 B1 | 1/2001 | Fassbender et al. |
| 6,214,617 B1 | 4/2001 | Herman |
| 6,238,546 B1 | 5/2001 | Knieper et al. |
| 6,267,888 B1 | 7/2001 | Satyanarayana |
| 6,277,279 B1 | 8/2001 | Hruza |
| 6,281,001 B1 | 8/2001 | McNelly |
| 6,325,916 B1 | 12/2001 | Lambert et al. |
| 6,325,934 B1 | 12/2001 | Tobey, Jr. et al. |
| 6,329,196 B1 | 12/2001 | Johnson et al. |
| 6,346,197 B1 | 2/2002 | Stephenson et al. |
| 6,350,350 B1 | 2/2002 | Jensen et al. |
| 6,358,398 B1 | 3/2002 | Halldorson et al. |
| 6,406,629 B1 | 6/2002 | Husain et al. |
| 6,416,993 B1 | 7/2002 | Wexler et al. |
| 6,465,240 B1 | 10/2002 | Wexler et al. |
| 6,471,869 B1 | 10/2002 | Yanou et al. |
| 6,488,835 B1 | 12/2002 | Powell |
| 6,645,385 B2 | 11/2003 | Krulik et al. |
| 6,689,271 B2 | 2/2004 | Morkovsky et al. |
| 6,719,894 B2 | 4/2004 | Gavrel et al. |
| 6,755,970 B1 | 6/2004 | Knappe et al. |
| 6,855,838 B2 | 2/2005 | Haas et al. |
| 6,890,451 B2 | 5/2005 | Sapienza et al. |
| 6,896,804 B2 | 5/2005 | Haerther et al. |
| 6,964,738 B1 | 11/2005 | Shen |
| 6,965,044 B1 | 11/2005 | Hammond et al. |
| 7,008,538 B2 | 3/2006 | Kasparian et al. |
| 7,211,185 B2 | 5/2007 | Powell |
| 7,264,732 B2 | 9/2007 | Bradley |
| 7,297,279 B2 | 11/2007 | Johnson et al. |
| 7,381,323 B2 | 6/2008 | Umezawa et al. |
| 7,404,900 B2 | 7/2008 | Bradley |
| 7,410,584 B2 | 8/2008 | Devine |
| 7,449,117 B2 | 11/2008 | Nakayama |
| 7,459,083 B1 | 12/2008 | Hong et al. |
| 7,666,234 B2 | 2/2010 | Ghosh et al. |
| 7,695,534 B2 | 4/2010 | Lawson et al. |
| 7,722,755 B2 | 5/2010 | Lawson et al. |
| 7,758,742 B2 | 7/2010 | Powell |
| 7,981,293 B2 | 7/2011 | Powell |
| 7,981,301 B2 | 7/2011 | Powell |
| 7,998,225 B2 | 8/2011 | Powell |
| 8,048,279 B2 * | 11/2011 | Powell ............... C02F 1/463 204/194 |
| 8,133,382 B2 | 3/2012 | Powell |
| 8,192,617 B2 | 6/2012 | Powell |
| 2003/0121864 A1 | 7/2003 | Kin et al. |
| 2003/0209489 A1 | 11/2003 | Haerther et al. |
| 2004/0188348 A1 | 9/2004 | Yamasaki et al. |
| 2005/0045534 A1 | 3/2005 | Kin et al. |
| 2005/0081435 A1 | 4/2005 | Lastella |
| 2006/0111600 A1 | 5/2006 | Mecham |
| 2007/0278152 A1 | 12/2007 | Musale |
| 2009/0294353 A1 | 12/2009 | Massie |
| 2009/0301963 A1 | 12/2009 | Brockmann et al. |
| 2010/0072131 A1 | 3/2010 | Nick et al. |
| 2010/0126869 A1 | 5/2010 | Wiemers |
| 2011/0024361 A1 * | 2/2011 | Schwartzel ............... C02F 1/467 204/290.01 |
| 2012/0118035 A1 | 5/2012 | Zhao et al. |

FOREIGN PATENT DOCUMENTS

| | | |
|---|---|---|
| AU | 685260 B2 | 1/1998 |
| AU | 707432 B2 | 7/1999 |
| AU | 721834 B2 | 7/2000 |
| DE | 1526687 A1 | 2/1970 |
| DE | 2832664 A1 | 2/1980 |
| EP | 803274 | 10/1997 |
| GB | 1526687 A | 9/1978 |
| GB | 2172815 A | 10/1986 |
| GB | 2272171 A | 5/1994 |
| JP | S61164695 A | 7/1986 |
| JP | 7116667 | 5/1995 |
| WO | 9400860 A1 | 1/1994 |
| WO | 9617667 A2 | 6/1996 |
| WO | 9640591 A1 | 12/1996 |
| WO | 9817589 A1 | 4/1998 |
| WO | 0153568 A1 | 7/2001 |
| WO | 03078035 A1 | 9/2003 |

OTHER PUBLICATIONS

"Clarifiers", Clarifier, Waste Treatment Clarifier, clarifiers, Met-Chem, Inc., webpage, as early as Mar. 18, 2007, available at http://metchem.com/clarifier.htm, printed on Oct. 21, 2008, pp. 1-2.
"Electrocoagulation", Advertisement/Brochure for Cardia Technologies Ltd., as early as 1993, pp. 1-6.
"Electrocoagulation Report", Aquagy™, Sep. 2010, 7 pages.
"Memcor® Membranes. Quality. Reliability. Experience.", MEMCOR Products—Ultrafiltration and Microfiltration Water and Wastewater

(56) References Cited

OTHER PUBLICATIONS

Systems, Siemens webpage, available at http://water.siemens.com/en/product_lines/memcor_products/Pages/default.aspx?g..., printed on Oct. 20, 2008, p. 1.

"Operating Instructions Manual—Open Chamber Electrocoagulation Demonstration Unit", Vortex™ Water Systems, LLC., dated Feb. 1998, pp. 1-14.

"Reverse Osmosis", Reverse Osmosis—Wikipedia, the free encyclopedia webpage, as early as Apr. 4, 2004, available at http://en.wikipedia.org/wiki/Reverse_osmosis, printed on Oct. 22, 2008, pp. 1-6.

"Sewage treatment", Sewage treatment—Wikipedia, the free encyclopedia webpage, last modified Oct. 21, 2008, available at http://en.wikipedia.org/wiki/Sewage_treatment, printed on Oct. 22, 2008, pp. 1-10.

"Ultrafiltration", ultrafiltration: Definition from Answers.com website, available at http://www.answers.com/topic/ultrafiltration, printed on Oct. 20, 2008, p. 1.

Ultrafiltration, Ultrafiltration—Wikipedia, the free encyclopedia webpage, available at http://en.wikipedia.org/wiki/Ultrafiltration, printed on Oct. 22, 2008, p. 1.

Vortex™ Water Systems, LLC., Brochure/Advertisement, pp. 1-6, after Dec. 1995.

"Water purification", Water purification—Wikipedia, the free encyclopedia webpage, last modified Oct. 20, 2008, available at http://en.wikipedia.org/wiki/Water_purification, printed on Oct. 22, 2008, pp. 1-5.

Author Unknown, "Electrocoagulation Systems", pp. 1-9, dated unknown.

Barkley, et al., "Emerging Technology Summary—Electro-Pure Alternating Current Electrocoagulation", Superfund Innovative Technology Evaluation, Sep. 1993, EPA/640/S-937507, pp. 1-5.

Baumgarten, et al., "Reduction of the Nitrogen and Carbon Content in Swine Waste with Algae and Bacteria", Appl Microbiol Biotechnol, Aug. 1999, 52(2), pp. 281-281 (Abstract only).

Chan, et al., "Microalgae as Bioabsorbents for Treating Mixture of Electroplating and Sewage Effluent", Biomed Environ Sci, Sep. 1991, 4(3), pp. 250-261 (Abstract only).

Chrost, et al., "Degradation of Urea by Bacteria and Algae in Mass Algal Cultures", Acta Microbiol Pol B, 1975, 7(4), pp. 231-236 (Abstract only).

Fletcher, et al., "Industrial Electochemistry", Second Edition, Chapman-Hall, 1990, Great Britain, pp. 337-338 and 560-561.

Grigg, AWWA Trade Waste Interest Group and Institute for Sustainable Futures—Joint Seminar, Presentation of Paper, Sep. 14-15, 1999, pp. 1-6.

Hammouda, et al., "Microalgae and Wastewater Treatment", Ecotoxicol Environ Saf, Aug. 1995, 31(3), pp. 205-210 (Abstract only).

Holt, et al., "Electrocoagulation: A Technology-Oriented Review", Department of Chemical Engineering, University of Sydney, 2006, pp. 1-61.

Horn, "Informational Memorandum for the Deputy Secretary of Agriculture of the U.S. Re: Electrocoagulation", Dec. 11, 1995, pp. 1-4.

Matusiak, et al., "Studies on the Purification of Wastes from the Nitrogen Fertilizer Industry by Intensive Algal Cultures. IV. Growth of Chlorella Vulgaris in Wastes with High Nitrogen Content in Continuous and Intermittent Light", Acta Microbiol Pol, 1977, 26(1), pp. 79-93 (Abstract only).

Matusiak, "Studies on the Purification of Wastewater from the Nitrogen Fertilizer Industry by Intensive Algal Cultures. I. Growth of Chlorella Vulgaris in Wastes", Acta Microbiol Pol, 1976, 25(3), pp. 233-242 (Abstract only).

Miernik, "The Quality of Protein from Algae Used in the Purification of Wastewater from the Nitrogen Fertilizer Industry", Acta Microbiol Pol, 1983, 32(3), pp. 269-274 (Abstract only).

Miner, et al., "Managing Livestock Wastes to Preserve Environmental Quality", Iowa State University Press, 2000, pp. 1-318.

Powell, "Electrocoagulation—A Technical Analysis", on behalf of Vortex™ Water Systems, LLC, 1995, pp. 1-25.

Powell, "Water Reuse Eliminates Government Required Treatments for Wastewater Discharges", Clean Tech 2003 Proceedings, 10th Annual International Cleaning Technology Exposition, Mar. 2003, pp. 270-272.

Smith, "Applications of New Concepts of Physical-Chemical Wastewater Treatment", Progress in Water Technology, vol. 1, Pergamon Press, edited by W.W. Eckenfelder, et al., paper presented at Vanderbilt University, sponsored by The International Association on Water Pollution Research & The American Institute of Chemical Engineers, Sep. 18-22, 1972, pp. 1-10.

Woytowich, et al., "Electrocoagulation (CURE) Treatment of Ship Bilgewater for the U.S. Coast Guard in Alaska", MTS Journal, vol. 27, No. 1, Spring 1993, pp. 62-67.

Smith, "Birth of "ELECHEM" System", Progress in Water Technology, vol. 1, Pergamon Press, Vanderbilt University, Sep. 18-22, 1972, 10 pages.

\* cited by examiner

SYSTEM AND METHOD FOR REMEDIATION OF WASTEWATER INCLUDING AEROBIC AND ELECTROCOAGULATION TREATMENT

CROSS-REFERENCE TO RELATED APPLICATION

This application is a division of U.S. patent application Ser. No. 16/434,607 filed Jun. 7, 2019; which is a division of U.S. application Ser. No. 13/774,956, filed Feb. 22, 2013, now U.S. Pat. No. 10,358,361. The entire disclosures of each are hereby incorporated by reference.

FIELD OF THE INVENTION

The invention relates to a system and method for the remediation of wastewater. The remediation includes aerobic and electrocoagulation treatment.

SUMMARY

Over the last several years, an increase production of livestock and dairy products has resulted in a large quantity of waste that affects air and water quality in the surrounding areas. In addition, mining production also produces waste that is costly and difficult to remediate. Additionally, regulations on carbon dioxide and other byproducts have increased costs for power due to costly remediation methods.

In addition, a challenge in municipalities is the treatment of wastewater, including sewage water, stormwater runoff and septic tank waste. Domestic wastewater contains a plethora of residues from cooking, to cleaning to sanitary waste. A growing population puts additional challenges on an already strained system and municipalities struggle to economically and efficiently deal with wastewater. Wastewater treatment facilities play an important role in protecting water quality and the health of the community. Regulations on the federal, state and local levels assist in meeting this important role, but are often times difficult to meet.

The present invention addresses these and other problems by meeting the increasingly strict discharge permit requirements set forth by different government regulations. In addition, this present invention relates to a system and method to treat wastewaters from various sources. In addition, the system and method and system may be used to remediate waste that has built up in the bottom of bodies of waters, such as lagoons or tailing ponds, without costly shut downs.

The present invention relates to a wastewater treatment system comprising a biological treatment system and an electrocoagulation system. The combination of these systems eliminates a wide spectrum of wastes. Furthermore, each system is complimentary to the other. The biological treatment system eliminates wastes that the electrocoagulation system may not sufficiently remove, while the electrocoagulation system eliminates wastes that the biological treatment system may not sufficiently remove.

An aspect of the present invention relates to a system for remediating wastewater. The system comprises a primary cell, a finishing cell and an electrocoagulation cell or unit. The primary cell comprises treatment media that may be used to remove organics, inorganics, simple carbon compound comprising less than six carbon, phosphates, nitrates, ammonia, selenium and combinations thereof. The finishing cell may be used to remove solids, that may have been produced in the primary cell, from the treated water. The electrocoagulation cell reduces at least one secondary contaminant, including but not limited to, organics, inorganics, pharmaceuticals, bacteria, viruses, fecal chloroforms, phosphates, nitrates, metals, radioactive materials (radds) and combinations thereof. The water exiting the electrocoagulation cell may be discharged into public streams or may be recycled within the wastewater treatment system.

An aspect of the present invention relates to a method for remediating wastewater. The method comprises processing the wastewater in a primary cell to reduce the biological oxygen demand (BOD) in the wastewater. The finishing cell may decrease the total suspended solid (TSS) in the wastewater. The TSS may have increased due to treatment in the primary cell. The electrocoagulation cell may be used to remove a secondary contaminant.

An aspect of the invention is a wastewater treatment system for treating wastewater, the system comprising a primary cell, having a treatment media to treat the wastewater to produce a treated wastewater, the primary cell further having a plurality of plate diffusers and a plurality of baffles for directing flow of the wastewater through the primary cell, and wherein the primary cell reduces BOD in the wastewater by at least about 50%; a finishing cell, to separate the treated wastewater from the treatment media and to reduce TSS in the treated wastewater to produce a further treated wastewater; and an electrocoagulation unit, to further treat the further treated wastewater to produce a purified water.

An aspect of the invention is a method of treating a wastewater, the method comprising treating the wastewater in a primary cell, by a treatment media to produce a treated wastewater; separating the treatment media from the treated wastewater; and purifying the treated wastewater in an electrocoagulation cell to produce a purified water.

An aspect of the invention is a method of treating a wastewater, the method comprising treating the wastewater in a primary cell, by a treatment media, wherein the treatment media is hydrogen peroxide, at a temperature below about 4° C. to produce a treated wastewater; separating the treatment media from the treated wastewater; and purifying the treated wastewater in an electrocoagulation cell to produce a purified water.

An aspect of the invention is a method of remediating built-up waste in a body of water, the method comprising providing a mixing unit to a primary cell; mixing the built-up waste with a wastewater in a primary cell to produce a remediating wastewater, wherein the remediating wastewater is treated with a treatment media to produce a treated wastewater; separating the treatment media from the treated wastewater; and purifying the treated wastewater in an electrocoagulation cell to produce a purified water.

An aspect of the invention is a method of converting carbon dioxide, the method comprising providing carbon dioxide to a wastewater; treating the wastewater in a primary cell, wherein the wastewater is treated with a treatment media to produce a treated wastewater; separating the treatment media from the treated wastewater; and purifying the treated wastewater in an electrocoagulation cell to produce a purified water.

These and other aspects and embodiments of the invention will now be described in greater details.

DETAILED DESCRIPTION

Figure 1:
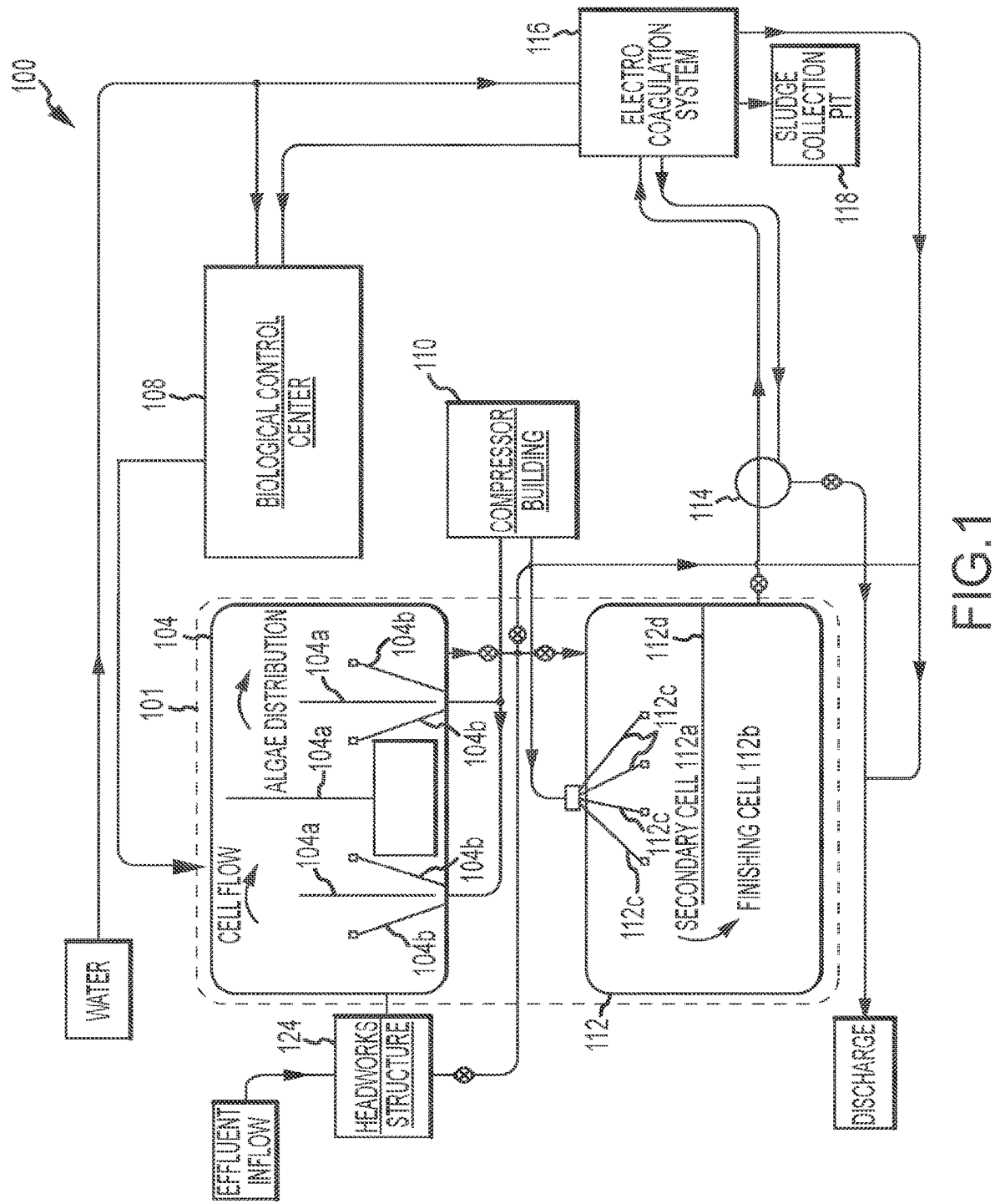
FIG. 1 illustrates a wastewater treatment system in a preferred embodiment of the present invention.

The present invention relates to a method and system for the remediation of wastewater including aerobic and electrocoagulation.

An embodiment of the present invention is a wastewater treatment system. The system comprises a primary cell. The wastewater is treated within the primary cell with a treatment media to produce a treated wastewater. The treated wastewater is sent to a finishing cell, where the treatment media settles in the finishing cell to separate the treated wastewater from the treatment media. Treatment with the treatment media may occur in the biological treatment system of the wastewater treatment system. The treated wastewater is further delivered to an electrocoagulation cell to produce a more refined treated wastewater.

The wastewater treatment system comprises a biological treatment system and an electrocoagulation cell. In the biological treatment system, wastewaters are treated to decrease the biological oxygen demand (BOD) in the wastewater. Wastewaters entering the headworks of the wastewater treatment system may comprise about 100% BOD. The headworks may reduce large inert waste, for example, plastics, towels, clothing and the like. The wastewater then enters the biological treatment system of the wastewater treatment system and the BOD may be reduced by between about 50% to about 80%. The total suspended solid (TSS) may increase in the biological treatment system as sugar is converted to bacteria. TSS are solids that are bigger than about 0.45 microns. If a secondary cell is used in the biological treatment system, then the BOD may again be reduced by between about 50% to about 80%. The TSS level may also decrease in the finishing cell as it settles in the finishing cell and is removed. The BOD of treated waters entering the electrocoagulation cell may further be decreased to greater than about 85% to about 99%, in some embodiments about 95% compared to the wastewater entering the wastewater treatment system. It is important to note that without the biological treatment system, the electrocoagulation cell may only reduce BODs by about 75%. Some municipalities require that the BOD be reduced by at least about 85%. Thus, the biological treatment system in combination with an electrocoagulation cell meets BOD regulated levels.

The treatment media may be any suitable oxidizing material. In some embodiments, the treatment media is an aerobic plant or microbial material, nutrient or living organism. In one embodiment, the treatment media is a plant or microbial, such as algae. In some embodiments, the treatment media may be bacteria, fly ash, activated carbon, lime, the like and combinations thereof. The aerobic action of the algae results in oxygenation of the wastewater. In some embodiments, the treatment media may be hydrogen peroxide. Hydrogen peroxide may be used at any temperature, but may be a preferred treatment media at temperatures less than about 4° C. (about 40° F.).

Treated wastewater or purified water as used throughout the specification includes water free from total dissolved solids, and total suspended solids. Water free of organics may include water containing colloidal clay, metal ions, alkali metals, alkali earth metals, halogens, and noble gases. Water substantially free of organics and inorganics indicates the ability to treat water making items separable in trace amounts. In some embodiments, treated water may be used to describe waters that have been treated with the treatment media in the biological treatment system, while purified water may be used to describe waters that have been treated in an electrocoagulation cell.

Wastewater may be produced in various industries. Sources of wastewater include, but are not limited to, utility plants, surface waters, including river waters, manufacturing, concentrated animal feed operation (CAFO), sewage, including septic tanks, mining, oil recovery, gas recovery, gas conversion, combinations thereof and the like. The wastewater treatment system may reduce odors associated with processed fluids. In some embodiments, the wastewater may be or further comprise carbon dioxide, for example carbon dioxide produced in power plants. The wastewater containing or comprising carbon dioxide may be treated with the treatment media to convert the carbon dioxide to oxygen. The biological process of the biological treatment system allows the electrocoagulation cell further downstream to release the oxygen gas and separate the byproduct, such as algae or single cell algae, from the treated waters.

In the primary cell, the wastewater is oxygenated with the treatment media. The primary cell may be any suitable shape. In some embodiments, the shape of the primary cell is chosen so that no void spots exist within the primary cell. This may be accomplished through the use of baffles in some embodiments. In still other embodiments, the primary cell may be an oval, conical, cylindrical or the like. In still other embodiments, the primary cell may comprise one or more lagoon. In some embodiments, the primary cell may comprise a plurality of plate diffusers, and/or a plurality of baffles. The plate diffusers may be of any shape or size. The plate diffusers mix the wastewater. In some embodiments, the diffuser is a fine bubble diffuser, a coarse bubble diffuser or combinations of fine and coarse bubble diffusers, while in other embodiments, the diffusers are plate diffusers. In still other embodiments, a combination of different types of diffusers may be used. The primary cell may also comprise a plurality of baffles. The baffles may be any shape or size. In some embodiments, the baffles are a curtain-type structure. Baffles may direct the flow of the fluid within the primary cell. The baffles may also control the flow of the fluid within the primary cell. Any suitable material may be used to form the baffles. In some embodiments, the material for the baffles may be aluminum, concrete, dirt, soil, corrosion resistant materials, stainless steel, steel, or combinations thereof.

In some embodiments, the wastewater treatment system may further comprise a biological control center. The biological control center may further comprise a greenhouse, at least one culture tank, a filtered fresh water source, a growth light, a microbial introduction unit, a microalgae feed supply unit, at least one distribution manifold and a purge unit. The culture tank may comprise micronutrients, bacteria, enzymes, treatment media, additives, growth media, carbon dioxide and combinations thereof and may grow the treatment media for use within the wastewater treatment system. The biological treatment system may introduce microbials into the primary cell. Some selected species of algae are disclosed in U.S. Pat. No. 6,896,804, the entirety of which is incorporated by reference in its entirety. The microalgae feed supply unit may comprise macro and micro nutrients.

The biological control center may further comprise at least one immersion heater. The immersion heater may be any suitable heating unit. By way of example, the immersion heater may be a stainless steel tank heater. The immersion heater may heat the growth tank to a temperature between about 0° C. to about 100° C., in some embodiments between about 15° C. to about 27° C. In some embodiments, the immersion heater may increase the temperature of the growth tanks in the biological control center to a temperature of about 15° C., about 20° C., about 25° C., and about 27° C. The biological control center may further comprise at least one distribution tank. The biological control center may further comprise a liquid level control unit, wherein the liquid level control unit controls the distribution tank. In some embodiments, the control unit may be manually operated, while in other embodiments, the control unit may be automated.

In some embodiments, the wastewater treatment system may further comprise at least one algae distribution tube for distributing the treatment media from the biological control system to the primary cell. The algae distribution tube may be capable of distributing algae and may also be capable of purging the distribution tube with air or fluid in order to clean or clear the distribution tube of the treatment media or other components.

The wastewater system may further comprise a headworks. The headworks filters and removes large bodies for disposal. The headworks may be gravity based or utilize mechanical means, such as pumps, to move the wastewater to the primary cell. The headworks may also be the incoming point of wastewaters from multiple sources for treatment in the wastewater treatment system. Wastewaters exit the headworks for treatment in the biological treatment system of the wastewater treatment system.

The wastewater system may further comprise a pump to move the treated wastewater from the finishing cell to the electrocoagulation unit. Pumps and valves may be used throughout the system in order to control the flow of fluids within the system and/or to move fluid from one location within the wastewater treatment system from one part of the system to another system. The pumps may be sized to accommodate a certain flow rate of the wastewater.

The wastewater treatment system may further comprise a recycling unit to recycle the treatment media from one location in the system to another location within the system. For example, the treatment media may be recycled from the finishing cell to the primary cell, and/or a lagoon. In some embodiments, sludge from the electrocoagulation unit may also be recycled to the primary cell, a lagoon and/or a sludge pit. In still other embodiments, discharge streams in various units may be recycled to the inlet of the system and/or an upstream system (i.e. the biological treatment system).

The wastewater treatment system may further comprise a treatment media distribution unit. The treatment media distribution unit may comprise several elements including a compressor building, at least one fractional hp air compressor, a plurality of weighted air lines, and a plurality of weighted distribution treatment media lines. The treatment media distribution unit distributes the treatment media throughout the wastewater treatment system.

The wastewater treatment system may include a solar power unit for powering the wastewater treatment system.

The wastewater treatment system may further comprise a mixing unit. The mixing unit may enhance the suspension of the treatment media and waste material in the wastewater treatment system. Mixing units may reside in any location within the wastewater treatment system, by way of example in a lagoon, the primary cell or secondary cell. The mixing unit may be a vertical laminar mixing unit, a fine or coarse bubble diffuser, or another suitable mixing unit. The mixing unit may be retrofitted into an existing location in the wastewater treatment system.

In some embodiments, the wastewater treatment system may be used to remediate and reduce waste products within a body of water, for example a lagoon and/or pond. Lagoons may comprise heavy metals, hydrocarbons, phosphate, and other waste products that may be treated in the wastewater treatment system. The mixing unit may be used to remediate build up of waste products in the body of waters by re-suspending the waste products into the wastewater, which is then processed in the wastewater treatment system. Thus, the wastewater treatment system may be an alternative process to costly toxic waste removal and processing. Furthermore, unlike toxic waste removal, the body of water may continually accept new waters without having to be "shut down" in order to process settled waste products.

The wastewater treatment system may be retrofitted into an existing wastewater treatment facility. The existing wastewater treatment facility may be an existing lagoon wastewater treatment facility.

Some embodiments of the present invention may further comprise a secondary cell. The secondary cell may comprise a finishing cell and a plurality of diffusers. In some embodiments, the finishing cell and the secondary cell are separate cells. In other embodiments, the secondary cell may further comprise a plurality of baffles.

In some embodiments, the primary cell and/or any additional cells may be a lined earth basin.

The wastewater treatment system may further comprise a plurality of distribution lines to distribute the treatment media within the wastewater treatment system. The distribution lines may further include a purge unit, or may be capable of purging the distribution lines, in order to reduce build-up within the purge lines. The build-up may be caused by the growth of the treatment media, bacteria, cells, and/or to remove suspended solids, metals or other particles or sludge, as well as any combination thereof, within the distribution lines. The distribution lines may also be purged in the event that the treatment media grows within the distribution lines.

The electrocoagulation unit may be any suitable unit. By way of example, a suitable electrocoagulation unit has been described in U.S. Pat. No. 6,139,710 or 8,048,279 which is incorporated by reference in its entirety. The electrocoagulation unit of the wastewater treatment system may further include at least one clarification tank and a clean fluid tank. The clarification tank may comprise an inner separation cylinder and an outer cylinder. The electrocoagulation unit may further comprise a sludge collection pit and a sludge drying pit.

In some embodiments, the wastewater treatment system may include an electrocoagulation tank cleaning system. The electrocoagulation tank cleaning system cleans the electrocoagulation tank as required and may be automatically activated or may be activated manually. The electrocoagulation tank cleaning system may comprise at least one clean fluid tank, a clean fluid supply for supplying clean fluid from the fluid water tank to the electrocoagulation unit, and a used fluid tube for providing used fluids from the electrocoagulation unit. The electrocoagulation cleaning system may provide cleaning fluids to the electrocoagulation tank in order to clean the tanks. Cleaning fluids may include any acids such as sulfuric acid, hydrochloric, phosphoric, acidic acid, and any combination thereof. Cleaning fluids may also include bases such as sodium hydroxide, potassium hydroxide and the like. The electrocoagulation tank cleaning system may further comprise at least one pump for supplying the clean fluid to the electrocoagulation unit. In some embodiments, the electrocoagulation tank cleaning system may further include at least one tank drain line for removing the cleaning fluid from the clean fluid tank.

Some embodiments of the wastewater treatment system further comprise at least one acid supply tank and/or at least one base supply tank. The acid supply tank may hold an acid and the base supply tank may hold a base and are capable of supplying an acid and/or a base to the electrocoagulation tank to regulate the pH of the electrocoagulation unit. The acid may be selected from the group consisting of phosphoric acid, sulfuric acid, acetic acid and combinations thereof. The base may be selected from the group consisting of magnesium hydroxide, potassium hydroxide, calcium hydroxide and combinations thereof. The concentration of the cleaning solution may vary. In some embodiments, between about, 10% to about 15% sulfuric acid may be used.

The wastewater treatment system of the present invention may also include at least one sludge tank and at least one drying bed. The drying bed receives sludge from the electrocoagulation unit and the sludge may be dried in the drying bed.

The wastewater treatment system may also include at least one purification fluid tank. The purification fluid tank where fluid removed from the sludge tank may be provided to the purified fluid tank. The purified fluid in the purified fluid tank may be supplied to the electrocoagulation unit. The purified fluid may also be supplied to a clean fluid tank.

The present invention also includes a method of treating a wastewater in a system. The method includes treating the wastewater in a primary cell, where the wastewater is treated with a treatment media to produce a treated wastewater, separating the treatment media from the treated wastewater, and purifying the treated wastewater in an electrocoagulation cell to produce a purified water.

The treatment media may be any suitable oxidizing material. In some embodiments, the treatment media is an aerobic plant or microbial material, nutrient or living organism. In one embodiment, the treatment media is a plant or microbial, such as algae. In some embodiments, the treatment media may be bacteria, fly ash, activated carbon, lime, the like and combinations thereof. The aerobic action of the algae results in oxygenation of the wastewater. In some embodiments, the treatment media may be hydrogen peroxide.

The primary cell may include a plurality of plate diffusers to mix the wastewater in the presence of the treatment media. The primary cell may also include a plurality of baffles to control the flow of the wastewater within the primary cell. The primary cell may remove at least one primary contaminant from the wastewater. The primary contaminant may be selected from the group consisting of organics, inorganics, a simple carbon compound comprising less than six carbon, phosphates, nitrates, ammonia, selenium and combinations thereof. Treatment in the electrocoagulation unit reduces at least one secondary contaminant. The secondary contaminant may be selected from the group consisting of organics, inorganics, pharmaceuticals, bacteria, viruses, fecal chloroforms, phosphates, nitrates and combinations thereof. In some embodiments, the residence time in the primary cell may depend on the contaminants within the wastewater. The wastewater may be treated in the primary cell for between about 2 hours to about 6 months. In some embodiments, the wastewater is treated in the primary cell for between about 3 days to about 6 months. In some embodiments, the wastewater is treated in the primary cell for between about 14 days to about 21 days. In still other embodiments, the wastewater is treated in the primary cell for a minimum of 14 days, while in some embodiments, the wastewater is treated for a minimum of 3 hours in the primary cell.

A secondary cell may also be used in the method for treating the wastewater. The secondary cell may include a plurality of diffusers to further mix the treated wastewater and/or a plurality of baffles to control the flow of the treated wastewater within the secondary cell. The residence time in the secondary cell may depend on the contaminants within the treated water exiting the primary cell or in the wastewater entering the primary cell. In some embodiments, the wastewater may be treated in the secondary cell for between about 2 hours to about 6 months. In some embodiments, the wastewater is treated in the secondary cell for between about 3 days to about 6 months. In some embodiments, the wastewater is treated in the secondary cell for between about 14 days to about 21 days. In still other embodiments, the wastewater is treated in the secondary cell for a minimum of 14 days, while in some embodiments, the wastewater is treated for a minimum of 3 hours in the secondary cell.

The finishing cell may treat waters for between about seven days to about 6 months.

The electrocoagulation unit may be used to reduce at least one secondary contaminant in the wastewater. The secondary contaminant may be selected from the group consisting of organics, inorganics, pharmaceuticals, bacteria, viruses, fecal chloroforms, phosphates, nitrates, metals, radds and combinations thereof. The residence time in the electrocoagulation unit may vary. In some embodiments, the residence time in the electrocoagulation unit is between about 1 second to about 2 days. In some embodiments, the residence time in the electrocoagulation unit is between about 10 seconds to about 3 minutes, from about 1 minute to about 10 minutes, in still other embodiments about 1 minute. The operating temperature of the electrocoagulation unit may be any suitable temperature such that the waters being processed in the electrocoagulation unit are liquid. In some embodiments, the operating temperature is between about 0° C. to about 100° C.

The method may be used to treat a wastewater fluid produced in a process. The process may be selected from the group consisting of a utility plant process, a manufacturing process, CAFOs, surface waters, including river waters, a municipal wastewater treatment process, including processing sewage fluids and septic tank fluids, a mining process, an oil recovery process, a gas recovery or conversion processes, combinations thereof and the like. The method used may also reduce odors emitted during the treatment of the wastewater. In some embodiments, the wastewater may be or further comprise carbon dioxide, for example carbon dioxide produced in power plants. The wastewater containing or comprising carbon dioxide may be treated with the treatment media to convert the carbon dioxide to oxygen. The biological process of the biological treatment system allows the electrocoagulation unit further downstream to release the oxygen gas and separate the byproduct, such as algae or single cell algae, from the treated waters.

The system and method may further be described as illustrated in FIGS. 1-5. FIG. 1 illustrates an overall wastewater treatment system 100. The wastewater treatment system 100 comprises a biological treatment system 101, which comprises a primary cell 104, and a secondary/finishing cell 112. Effluent flows into the primary cell 104. The effluent may be wastewater provided directly from a process or may be effluent from one or more holding basins for example a lagoon. Effluent may also be recycled from the discharge of the wastewater treatment system 100. The primary cell 104 may comprise baffles 104a and/or diffusers 104b. The effluent is oxygenated in the primary cell 104 with a treatment media that is distributed in the primary cell 104. The treatment media may be provided to the primary cell 104 from the biological control center 108. The fluid exiting the primary cell 104 enters a secondary/finishing cell 112. Valves and pumps may be used throughout the system to direct and control the flow of fluids between the different cells and tanks. As shown in FIG. 1, the secondary/finishing cell 112 may be one cell with two compartments at least partially separated by divider or baffle 112d, or it may be two separate cells comprising the secondary cell 112a and the finishing cell 112b. The secondary cell 112a may have diffusers 112c and/or multiple baffles 112d. An optional cell lift pump pit 114 may receive the fluid from the finishing cell 112b of the secondary/finishing cell 112. Alternatively, the treated fluid may be directed directly to the electrocoagulation unit 116. Sludge leaving the electrocoagulation unit 116 may be collected in the drying pit 118. Drying bed 118 may be any suitable device to dry or concentrate sludge. In some embodiments, the drying bed 118 is a sludge drying pit, a filter press, a belt press a vacuum clarifier, a hydrocyclone or the like. The electrocoagulation unit may further comprise a clarification unit. The clarification unit may comprise at least one clarification tank. Alternatively, the clarification tank may be separate from the electrocoagulation unit. Furthermore, processed fluid exiting the electrocoagulation unit 116 may be directed to the biological control center 108. Processed water exiting the electrocoagulation unit 116 may also be discharged to the outfall pipe. Fluid from the floor drain of the electrocoagulation unit 116 may be directed to the cell lift pump pit 114.

Compressor building 110 may be used to distribute air throughout the system 100, including to diffusers within the primary cell 104 and the optional secondary cell 112. The headworks structure 124 may be used to remove large articles from the wastewater inlet for disposal and is commonly known in the art.

Figure 2:
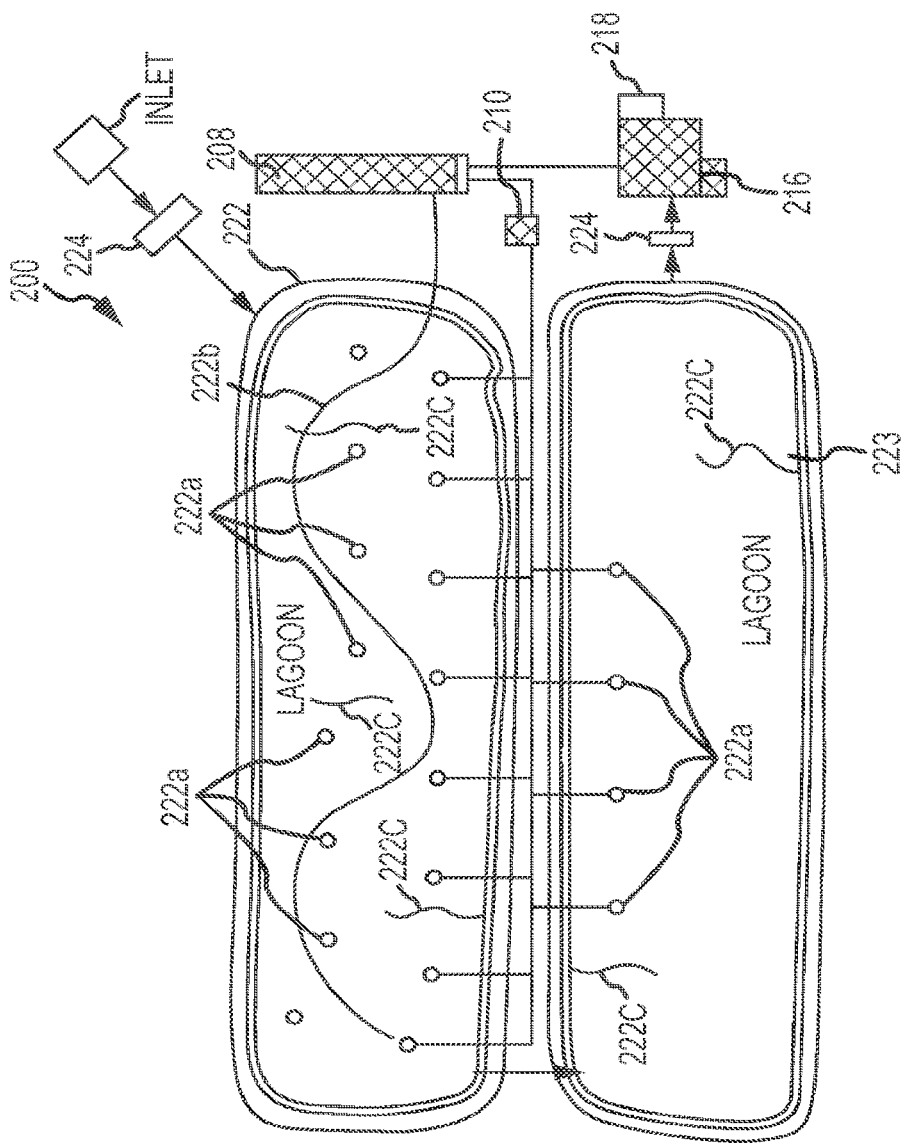
FIG. 2 illustrates a retrofitted existing lagoon facility in a preferred embodiment of the present invention.

FIG. 2 illustrates a retrofitted existing lagoon combined with the wastewater treatment system 200. Two lagoons 222 and 223 are illustrated in FIG. 2, though it is understood that any number of lagoons 222 and 223 may be used without deviating from the present invention. Lagoons 222 may be act as the primary cell and lagoon 223 may act as the secondary cell. Inlet wastewater may be processed through the headworks 224, prior to lagoon 222. Lagoons 222 may include diffusers 222a. Diffusers 222a may be used to remediate waste products that may have accumulated in the lagoon. The lagoon 222 may also include an algae culture line 222b. The algae culture line 222b may be connected to the biological control center 208. The lagoon 222 may also include a plurality of baffles 222c. The second lagoon 223 may comprise a plurality of diffusers 222a and a plurality of baffles 222c. Compressor building 210 may provide fluid, such as air, to the diffusers 222a in the lagoon 222 and/or lagoon 223. Fluid may exit the first lagoon 222 and enter the second lagoon 223, where the second lagoon 223 acts as the secondary cell. Fluid from the second lagoon 223 may enter an optional second headworks 224 to remove any large particles prior to entering and the electrocoagulation unit 216. Sludge from the electrocoagulation unit 216 may be collected in the drying bed 218. Processed fluid from the electrocoagulation unit 216 may be discharged to sewers, rivers, recycled to the inlet stream or other suitable locations.

Figure 3:
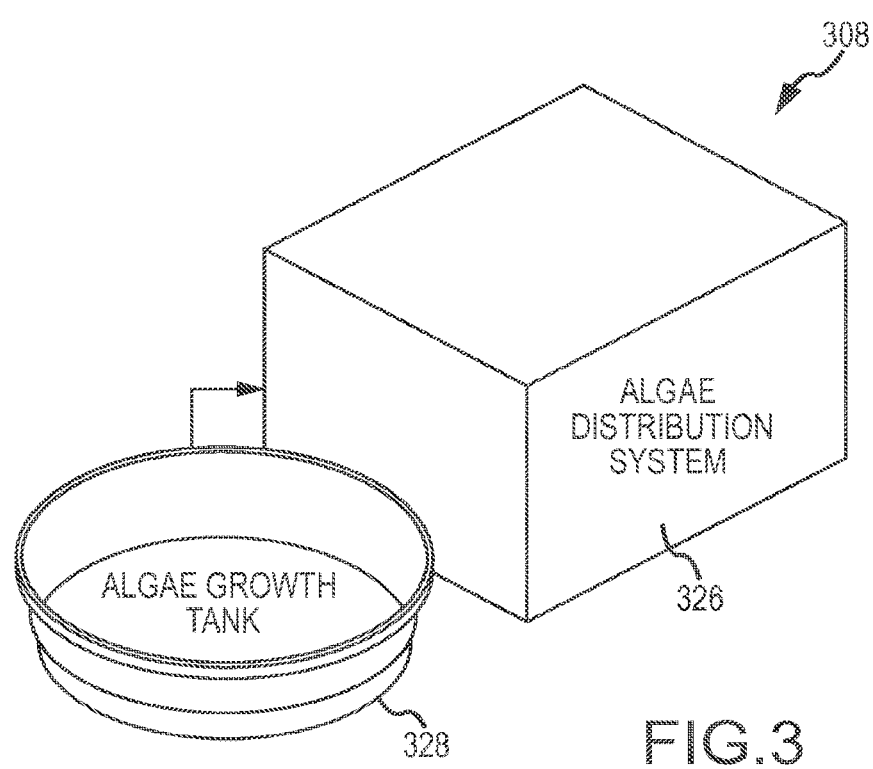
FIG. 3 illustrates a biological control system in a preferred embodiment of the present invention.

FIG. 3 illustrates a biological control system 308. The biological control system 308 may comprise an algae growth tank 328 and the algae distribution system 326. The algae growth tank 328 may be used to grow the treatment media therein. Treatment media may include algae. The algae distribution system 326 may distribute the treatment media from the algae growth tank 328 to the wastewater treatment system. The algae distribution system 326 may also be used to provide clean water and/or air to the distribution lines that provide the treatment media throughout the wastewater treatment system in order to clean or clear the distribution lines of growth from the treatment media.

Figure 4:
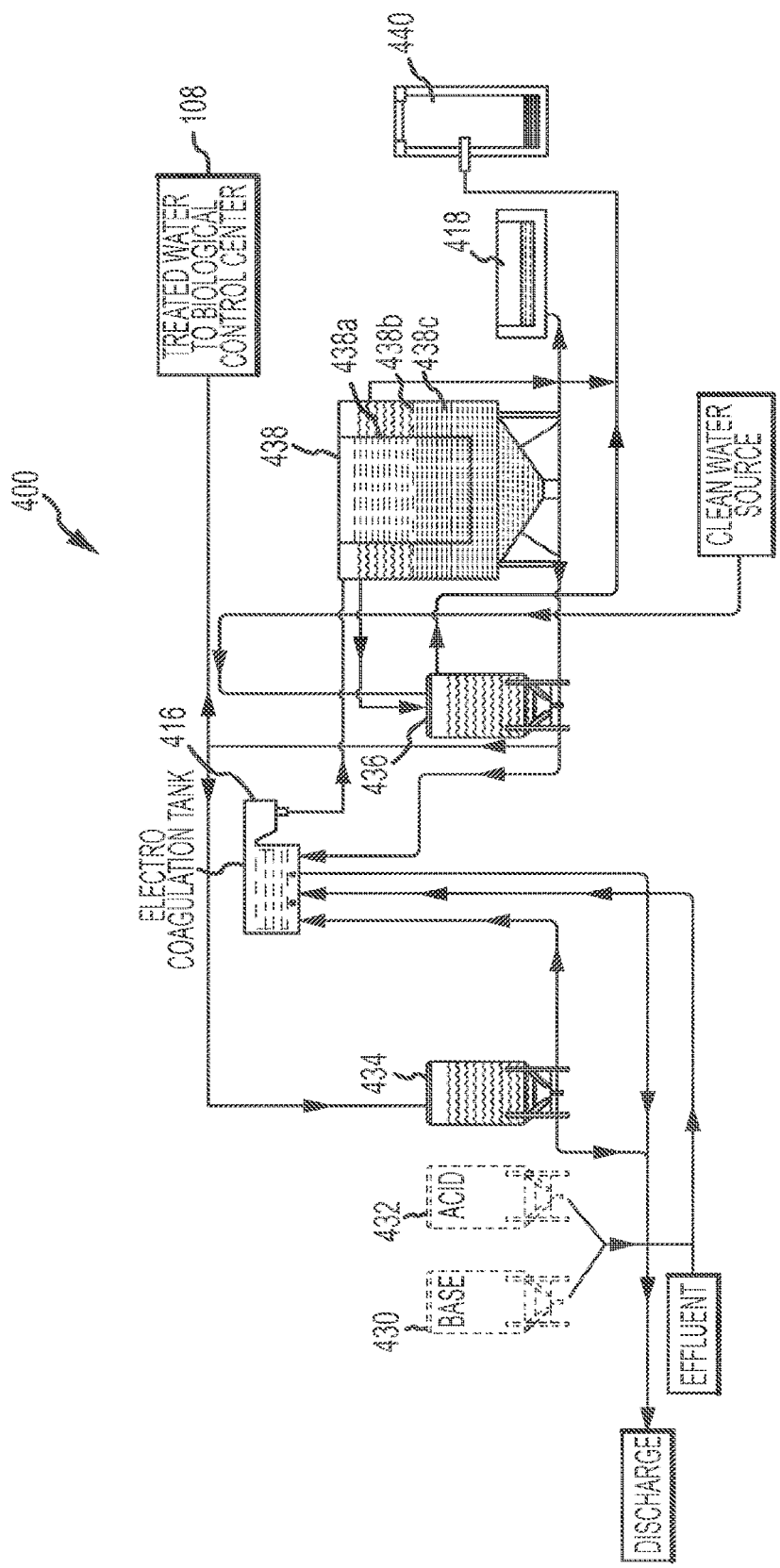
FIG. 4 illustrates an electrocoagulation and struvite system in a preferred embodiment of the present invention.

FIG. 4 illustrates an electrocoagulation and struvite system 400. Effluent fluid is provided to the electrocoagulation unit 416. The system 400 may comprise a base tank 430, which may contain about any base in a sufficient concentration to drive struvite formation. In some embodiments the concentration of the base is between about 0.1M to about 10M. In some embodiments, the base is $Mg(OH)_2$, KOH, $Ca(OH)_2$ and combinations thereof. The base may be provided in stoichiometric excess in order to drive the struvite formation to completion. The system 400 may also comprise an acid tank 432, which may contain about between about 75% to about 99% of an acid, in some embodiments about 95% of an acid such as $H_3PO_4$. The acid may be provided in a stoichiometric balance with the base in order to drive the struvite production. In some embodiments, the amount of ammonia is measured in order to determine the amount of acid and base required. The acid and base may be mixed to adjust the pH and may be provided to the electrocoagulation unit 416 at an appropriate pH. The electrocoagulation may work over a pH range of between about pH 4 to about 12. When struvite is being produced, the pH may be at a range of between about 7 to about 10, in some embodiments, a pH of about 8.

Valves may be used to eliminate the acid or base flow to the electrocoagulation unit 416. The system 400 may be equipped with valves and pumps throughout the system 400 to control and direct the flow of fluids within the system 400.

The system 400 may also comprise an optional in place cleaning system. The system 400 may comprise a clean fluid holding tank 434, which may provide a clean fluid to the electrocoagulation unit 416 in order to clean the electrocoagulation unit 416. The clean fluid holding tank 434 may contain a cleaning solution which is between about 10% to about 15% of the acid or base. By way of example, the cleaning solution may be the same acid provided for use in struvite production and may be provided from acid tank 432. In some embodiments, the acid may be about 10% to about 15% sulfuric acid. It is understood that any suitable acid or combination thereof may be used. In some embodiments, the acid may be HCl and/or acetic acid. The cleaning solution may be used over and over until the cleaning solution is spent (worn out). When the cleaning solution is spent, it may be place in the electrocoagulation feed tank for disposal through the electrocoagulation process.

Disinfected and purified water may held in storage tank 436. Water may be provided to the storage tank 436 from any clean water source, including sources outside of the system 400, such as city or portable water. The disinfected and purified water may be provided to the electrocoagulation unit 416 and/or may be provided to the clean fluid holding tank 434. The electrocoagulation process floods the water with electrons causing bacteria, virus, algae, and other living organisms to lice. In the presence of sodium chloride the electrocoagulation process may produce sodium hypochlorite or bleach.

Fluid exiting the outflow portion of the electrocoagulation unit 416 may be provided to one or more clarification tanks 438. The clarification tank 438 may be any suitable clarifier. In some embodiments, the clarification tank 438 may be a pond (settling), a decant tank, a filtration tank, or the like. In some embodiments, the clarification tank 438 may further comprise a rake or a sonic vibrator to move sludge within the clarification tank 438 and prevent the sludge from rat holing. In some embodiments, the clarification tank 438 may comprise several sections including the inner and outer separation cylinder 438a, the upper sludge 438b and the lower sludge 438c. Fluid in the inner and outer separation cylinder 438a is disinfected and purified water and may be provided to the storage tank 436, the sewage line 440, or the drying bed 418, and/or may be discharged from the system 400. In some embodiments, discharge from the system 400 may be recycled to the inlet of the electrocoagulation system 400 and/or the biological treatment system. By way of example, the disinfected and purified water may be discharged to a sewage line 440 (which may be above or below ground level). The disinfected and purified water is on the top most portion of the clarification tank 438 and is above the upper sludge limit 438b. As would be understood by one skilled in the art, the upper sludge limit 438b and lower sludge limit 438c may vary in the clarification tank 438. In some embodiments, the upper sludge limit 438b and the lower sludge limit 438c may be used to filter solids through a sludge blanket. In some embodiments, a small amount of sludge should remain in the clarification tank 438. The outlet for the disinfected and purified water may be located at any suitable location on the clarification tank 438. Sludge remaining in the clarification tank 438 may be directed to a drying bed 418. The drying bed 418 may be located underground or may be above ground.

Figure 5:
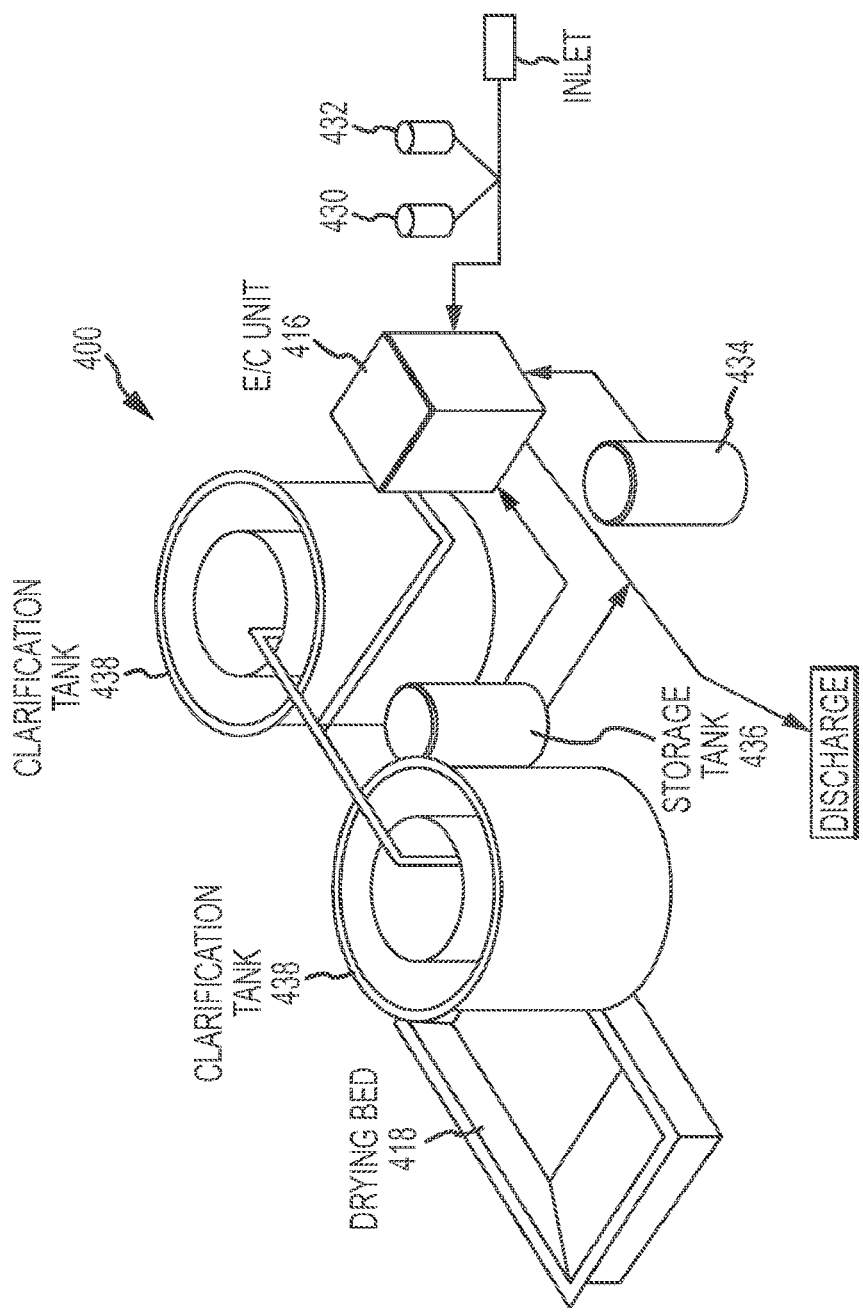
FIG. 5 illustrates an isometric view of an electrocoagulation system with certain components.

FIG. 5 illustrates an isometric view of an electrocoagulation and struvite system 400 with certain components. FIG. 5 illustrates the inner and outer separation cylinder of two clarification tanks 438. It is understood that though two clarification tanks 438 are illustrated in FIG. 5, any number of clarification tanks 438 may be used without deviating from the invention. The electrocoagulation unit 416 is connected to the clarification tanks 438 with distribution lines. The clean fluid holding tank 434 may provide cleaning fluid to the electrocoagulation unit 416. The system 400 may also comprise and acid tank 432 and/or a base tank 430 for struvite production. In some embodiments, the fluid in the clean fluid holding tank 434 may be used as the acid tank 432. Purified water supply from the storage tank 436 may also be provided to the electrocoagulation unit 416. Sludge exiting the clarification tanks 438 may be directed to the drying bed 418.

Colloidal clays, bacteria, virus, suspended solids, dissolved solids, metal oxides, hydro carbons, the like and combinations thereof may be removed with the electrocoagulation unit. Table 1 illustrates examples of different contaminants that may be removed using the electrocoagulation unit. Table 1 illustrates the amount of a contaminant present in a water sample prior to use in an electrocoagulation unit, the concentration after processing in the electrocoagulation unit and the removal rate.

TABLE 1

| CONTAMINANT | BEFORE (mg/L) | AFTER (mg/L) | REMOVAL RATE (%) |
| --- | --- | --- | --- |
| Aldrin (pesticide) | 0.0630 | 0.0010 | 98.40 |
| Aluminum | 224.0000 | 0.6900 | 99.69 |
| Ammonia | 49.0000 | 19.4000 | 60.41 |
| Arsenic | 0.0760 | <0.0022 | 97.12 |
| Barium | 0.0145 | <0.0010 | 93.10 |
| Benzene | 90.1000 | 0.3590 | 99.60 |
| BOD | 1050.0000 | 14.0000 | 98.67 |
| Boron | 4.8600 | 1.4100 | 70.98 |
| Cadmium | 0.1252 | <0.0040 | 96.81 |
| Calcium | 1,321.0000 | 21.4000 | 98.40 |
| Chlorieviphos (pesticide) | 5.8700 | 0.0300 | 99.50 |
| Chromium | 139.0000 | <0.1000 | 99.92 |
| Cobalt | 0.1238 | 0.0214 | 82.71 |
| Copper | 0.7984 | <0.0020 | 99.75 |
| Cyanide (Free) | 723.0000 | <0.0200 | 99.99 |
| Cypermethrin (pesticide) | 1.3000 | 0.0700 | 94.60 |
| DDT (pesticide) | 0.2610 | 0.0020 | 99.20 |
| Diazinon (pesticide) | 34.0000 | 0.2100 | 99.40 |
| Ethyl Benzene | 428.0000 | 0.3720 | 99.91 |
| Fluoride | 1.1000 | 0.4150 | 62.27 |
| Gold | 5.7200 | 1.3800 | 75.87 |
| Iron | 68.3400 | 0.1939 | 99.72 |
| Lead | 0.5900 | 0.0032 | 99.46 |
| Lindane (pesticide) | 0.1430 | 0.0010 | 99.30 |
| Magnesium | 13.1500 | 0.0444 | 99.66 |
| Manganese | 1.0610 | 0.0184 | 98.27 |
| Mercury | 0.7200 | <0.0031 | 98.45 |
| Molybdenum | 0.3500 | 0.0290 | 91.71 |
| MP-Xylene | 41.6000 | 0.0570 | 99.86 |
| MTBE | 21.5800 | 0.0462 | 99.79 |
| Nickel | 183.0000 | 0.0700 | 99.96 |
| Nitrate | 11.7000 | 2.6000 | 77.78 |
| Nitrite | 21.0000 | 12.0000 | 42.86 |
| Nitrogen TKN | 1,118.8800 | 59.0800 | 94.72 |
| NTU | 35.3800 | 0.3200 | 99.10 |
| O-Xylene | 191.0000 | 0.4160 | 99.78 |
| PCB (Arochlor 1248) | 0.0007 | <0.0001 | 85.71 |
| Petroleum Hydrocarbons | 72.5000 | <0.2000 | 99.72 |
| Phosphate | 28.0000 | 0.2000 | 99.28 |
| Platinum | 4.4000 | 0.6800 | 84.55 |
| Potassium | 200.0000 | 110.0000 | 45.00 |
| Proptamphos (pesticide) | 80.8700 | 0.3600 | 99.60 |
| Selenium | 68.0000 | 38.0000 | 44.00 |
| Silicon | 21.0700 | 0.1000 | 99.50 |
| Sulfate | 104.0000 | 68.0000 | 34.61 |
| Silver | 0.0081 | 0.0006 | 92.59 |
| Tin | 0.2130 | <0.0200 | 90.61 |
| Tolulene | 28,480.0000 | 0.2270 | 99.99 |
| TSS | 1,560.0000 | 8.0000 | 99.49 |
| Vanadium | 0.2621 | <0.0020 | 99.24 |
| Zinc | 221.00 | 0.14 | 99.90 |
| Americium-241 | 71.9900 pCi/L | 0.5700 pCi/L | 99.20 |
| Plutonium-23 9 | 29.8500 pCi/L | 0.2900 pCi/L | 99.00 |
| Radium | 1093.0000 pCi/L | 0.1000 pCi/L | 99.99 |
| Uranium | 0.1300 mg/L | 0.0002 mg/L | 99.83 |
| Bacteria | 110,000,000.00 cfu | 2,700.00 cfu | 99.99 |
| Coliform | 318,000.0000 cfu | <1.00 cfu | 99.99 |
| E coli Bacteria | >2,419.20 mpn | 0.00 mpn | 99.99 |
| Enterococcus Bacteria | 83.00 mpn | <10.00 mpn | 82.87 |
| Total Coliform Bacteria | >2,419.20 mpn | 0.00 mpn | 99.99 |

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of treating a wastewater, the method comprising:
    treating the wastewater in a primary cell, by a treatment media, wherein the treatment media is hydrogen peroxide, at a temperature below about 4° C. to produce a treated wastewater;
    separating the treatment media from the treated wastewater; and
    purifying the treated wastewater in an electrocoagulation cell to produce a purified water.

2. The method of claim 1, further including:
    wherein the primary cell includes a plurality of plate diffusers and a plurality of baffles for directing flow of the wastewater through the primary cell, and wherein the primary cell reduces BOD in the wastewater by at least about 50%; and
    providing a finishing cell, to separate the treated wastewater from the treatment media and to reduce TSS in the treated wastewater.

3. The method of claim 1, further comprising:
    providing an acid supply tank that holds an acid; and
    providing a base supply tank that holds a base wherein the acid supply tank and the base supply tank supply the acid and the base to regulate a pH of the treated wastewater being treated in the electrocoagulation unit.

4. The method of claim 3, wherein the base is selected from the group consisting of magnesium hydroxide, potassium hydroxide, calcium hydroxide and combinations thereof.

5. The method of claim 3, wherein the acid is selected from the group consisting of phosphoric acid, sulfuric acid, acetic acid and combinations thereof.

6. The method of claim 1, further comprising:
    providing a clarification tank for receiving sludge from the electrocoagulation unit; and
    providing a drying bed, wherein the sludge from the clarification tank is dried.

7. The method of claim 6, further comprising:
    providing a purification fluid tank wherein fluid removed from the clarification tank is provided to the purified fluid tank.

8. The method of claim 7, wherein the purified fluid in the purified fluid tank is supplied to the electrocoagulation unit.

9. A method of treating a wastewater, the method comprising:
    treating the wastewater in a primary cell, by a treatment media, wherein the treatment media is hydrogen peroxide, at a temperature below about 4° C. to produce a treated wastewater;
    separating the treatment media from the treated wastewater; and
    purifying the treated wastewater in an electrocoagulation cell to produce a purified water
    wherein the primary cell includes a plurality of plate diffusers and a plurality of baffles for directing flow of the wastewater through the primary cell, and wherein the primary cell reduces BOD in the wastewater.

\* \* \* \* \*